United States Patent

Kepner

[15] 3,640,153
[45] Feb. 8, 1972

[54] FOUR-SPEED RATIO POWER TRANSMISSION MECHANISM HAVING SIMPLE PLANETARY GEAR UNITS

[72] Inventor: Larry A. Kepner, Dearborn, Mich.
[73] Assignee: Ford Motor Company, Dearborn, Mich.
[22] Filed: Sept. 18, 1970
[21] Appl. No.: 73,523

[52] U.S. Cl. ..................................................74/759
[51] Int. Cl. ..........................F16h 3/44, F16h 57/10
[58] Field of Search .......................................74/759

[56] References Cited

UNITED STATES PATENTS 3,410,157  11/1968  Livezey..................................74/759
3,475,992  11/1969  West, Jr. et al.........................74/759

Primary Examiner—Leonard H. Gerin
Attorney—John R. Faulkner and Donald J. Harrington

[57] ABSTRACT

A power transmission mechanism for use in an automotive vehicle driveline comprising a three-speed ratio gear system having two torque input elements and a simple planetary ear unit situated between the torque input shaft and the two torque input elements of the three-speed ratio gear system, and clutches and brakes adapted to control the relative motion of the gear elements whereby the torque input shaft may be connected selectively to either of the torque input elements of the three-speed ratio gear system, the simple planetary unit being adapted to multiply the torque input to one of the input elements of the three-speed ratio gear system during low-speed ratio operation thereby providing a fourth overall ratio.

8 Claims, 8 Drawing Figures

Fig.2A

| | | | TYPICAL RATIOS | TYPICAL GEARSETS |
|---|---|---|---|---|
| 1 | $\left(1+\frac{S_1}{R_1}\right)$ | $\left[\left(1+\frac{R_2}{S_2}\right)\left(1+\frac{S_3}{R_3}\right)-\frac{R_2}{S_2}\right]$ | $(1+.5)\left[(1+2)(1+.33)-2\right]$ | 3.00 | $\frac{R_1}{S_1}=2$ |
| 2 | | $\left[\left(1+\frac{R_2}{S_2}\right)\left(1+\frac{S_3}{R_3}\right)-\frac{R_2}{S_2}\right]$ | $\left[(1+2)(1+.33)-2\right]$ | 2.00 | $\frac{R_2}{S_2}=2$ |
| 3 | | $\left(1+\frac{S_3}{R_3}\right)$ | $(1+.33)$ | 1.33 | $\frac{R_3}{S_3}=3$ |
| 4 | | 1 | 1 | 1.00 | |
| R | $\left(1+\frac{S_1}{R_1}\right)\left(\frac{R_2}{S_2}\right)$ | | $(1+.5)(2)$ | 3.00 | |

Fig.1A

| 1 | $\left(1+\frac{S_1}{R_1}\right)$ | $\left[\left(1+\frac{R_2}{S_2}\right)\left(1+\frac{S_3}{R_3}\right)-\frac{R_2}{S_2}\right]$ |
| --- | --- | --- |
| 2 | | $\left[\left(1+\frac{R_2}{S_2}\right)\left(1+\frac{S_3}{R_3}\right)-\frac{R_2}{S_2}\right]$ |
| 3 | | $\left(1+\frac{S_3}{R_3}\right)$ |
| 4 | | 1 |
| R | $\left(1+\frac{S_1}{R_1}\right)\left(\frac{R_2}{S_2}\right)$ | |

INVENTOR:
LARRY A. KEPNER
BY:
ATTORNEYS.

Fig. 3-A

| | | TYPICAL RATIOS | | | TYPICAL GEARSETS |
|---|---|---|---|---|---|
| 1 | $\left(1+\frac{S_1}{R_1}\right)\left(1+\frac{S_3}{S_2}\right)$ | $(1+.5)(1+1.0)$ | | 3.00 | |
| 2 | $\left(1+\frac{S_3}{S_2}\right)$ | $(1+1.0)$ | | 2.00 | $\frac{R_1}{S_1}=2$ |
| 3 | $\left(1+\frac{S_3}{R_3}\right)$ | $(1+.33)$ | | 1.33 | $\frac{S_3}{S_2}=1$ |
| 4 | 1 | 1 | | 1.00 | |
| R | $\left(1+\frac{S_1}{R_1}\right)\left(1-\frac{R_3}{S_2}\right)$ | $(1+.5)(1-3)$ | | 3.00 | $\frac{R_3}{S_3}=3$ |

Fig. 4-A

| | | | | | | |
|---|---|---|---|---|---|---|
| 1 | $\left(1+\frac{S_1}{R_1}\right)$ | $\left(1+\frac{S_3}{R_3}\right)$ | $\left(1+\frac{S_2}{R_2}\right)$ | $(1.53)$ | $(1.40)$ | 3.27 |
| 2 | | $\left(1+\frac{S_3}{R_3}\right)$ | $\left(1+\frac{S_2}{R_2}\right)$ | $(1.53)$ | $(1.40)$ | 2.14 |
| 3 | | | $\left(1+\frac{S_2}{R_2}\right)$ | | $(1.40)$ | 1.40 |
| R | $\left(1+\frac{S_1}{R_1}\right)$ | $\left(\frac{S_3}{R_3}\right)$ | $\left(1+\frac{R_2}{S_2}\right)$ | $(1.53)(.53)$ | $(3.5)$ | 2.83 |

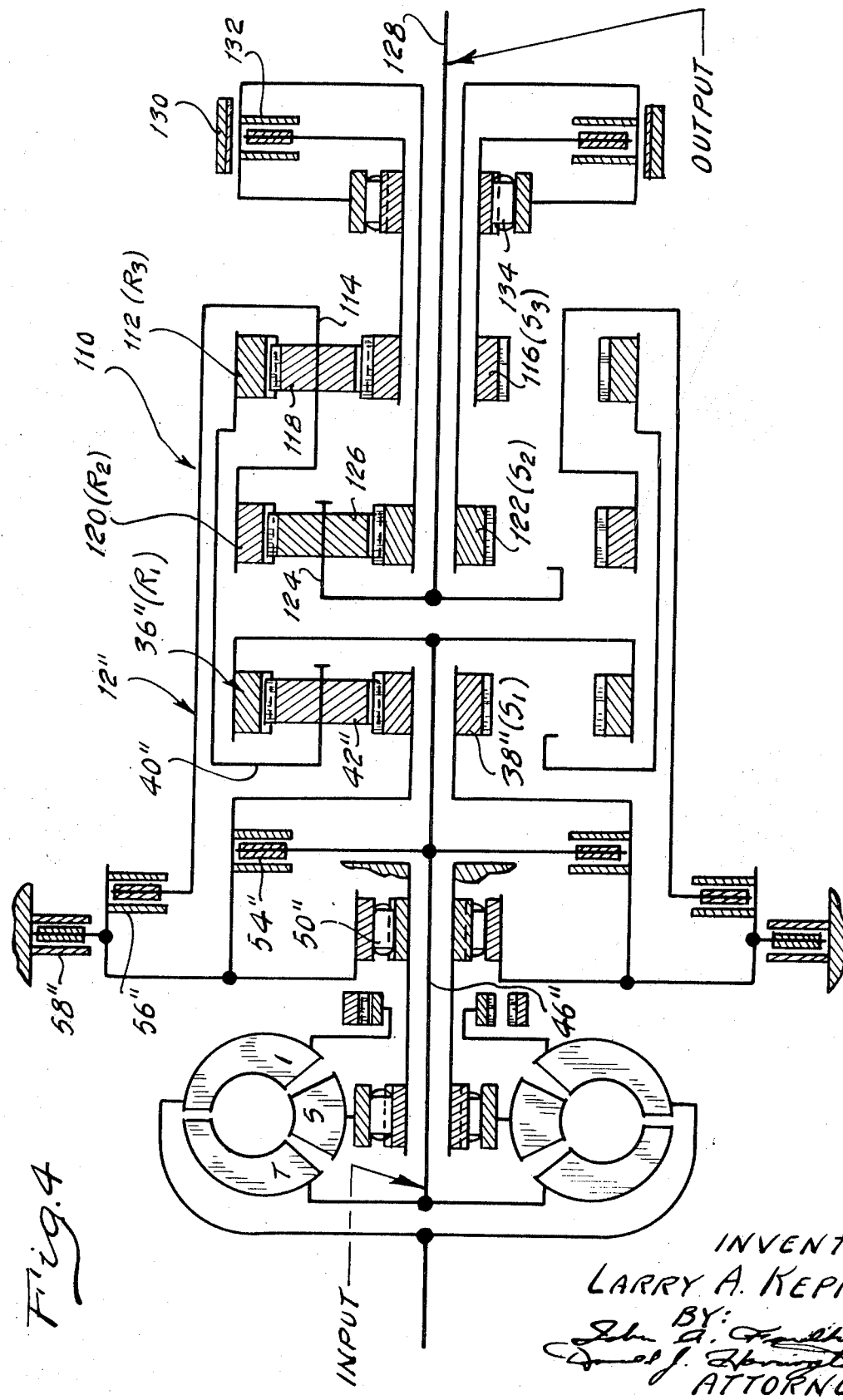

FOUR-SPEED RATIO POWER TRANSMISSION MECHANISM HAVING SIMPLE PLANETARY GEAR UNITS

GENERAL DESCRIPTION OF THE INVENTION

My invention is adapted especially to be used in an automotive vehicle driveline having an internal combustion engine and multiple ratio planetary gearing adapted to distribute engine torque to the vehicle traction wheels.

The improvement of my invention comprises a simplified power transmission mechanism for use in an automotive vehicle driveline which is characterized by four forward drive ratios and at least one reverse ratio. It includes primary planetary gearing having three forward driving ratios in combination with torque input gearing situated on the torque input side of the three-speed ratio gearing. The three-speed ratio gearing is characterized by two input gear elements. The torque input gearing is capable of selecting either one input element of the three-speed ratio gearing or the other depending upon which overall driving ratio is desired.

In the improved transmission mechanism of my invention the torque input gearing cooperates with the three-speed ratio gearing to provide a torque multiplication ratio that is greater than the torque multiplication ratio capable of being achieved with the three-speed ratio gear unit acting alone. It provides also a reverse ratio having adequate torque multiplying capacity for a practical automotive vehicle driveline.

I have achieved this improved arrangement while using a minimum number of friction torque establishing devices and while retaining the basic design simplicity of a three-speed ratio gear system. This is done while retaining many of the design characteristics of conventional three-speed ratio gear systems, thereby providing a degree of interchangeability of elements between my improved transmission mechanism and known three-speed ratio gear systems.

The magnitude of the ratio change between the third forward drive ratio and the fourth forward driving ratio in my design is relatively small compared to the magnitude of the corresponding ratio change in other types of four-speed ratio transmission systems known in the art. This close ratio step is desirable when the driveline is used with high speed engines where inertia forces due to changes in engine speed upon a ratio change from the third ratio to the fourth ratio or from the fourth ratio to the third ratio must be considered. The relatively small ratio change between the two highest speed ratios is achieved in my improved design without lowering the effective ratios available in first and reverse drives. Those ratios are adequate to provide the necessary torque multiplication during operation in low or reverse.

This disclosure describes several embodiments of my invention wherein a basic three-speed ratio gear system having two input elements may be combined in structural cooperation with a torque input gear system which selects one input element or the other in the ratio changing shift pattern.

BRIEF DESCRIPTION OF THE FIGURES OF THE DRAWINGS

FIG. 1A is a chart showing the magnitude of the torque multiplication ratios available in the mechanism of FIG. 1. Each ratio is expressed in terms of sun gear and ring gear pitch diameters.

FIG. 2A is a chart showing the relative magnitude of the various torque multiplication ratios for the embodiment of FIG. 2.

FIG. 3A is a chart showing the relative magnitudes of the torque multiplication ratios for the mechanism of FIG. 3.

FIG. 4 is a fourth embodiment of my invention, which includes features common to the embodiments of FIGS. 1, 2 and 3 but which includes a different clutch arrangement and a different three-speed ratio, double-input gear system on the torque output side of the transmission.

FIG. 4A is a chart showing the relative magnitudes of the torque ratios for the mechanism of FIG. 4.

PARTICULAR DESCRIPTION OF THE INVENTION

Figure 1:
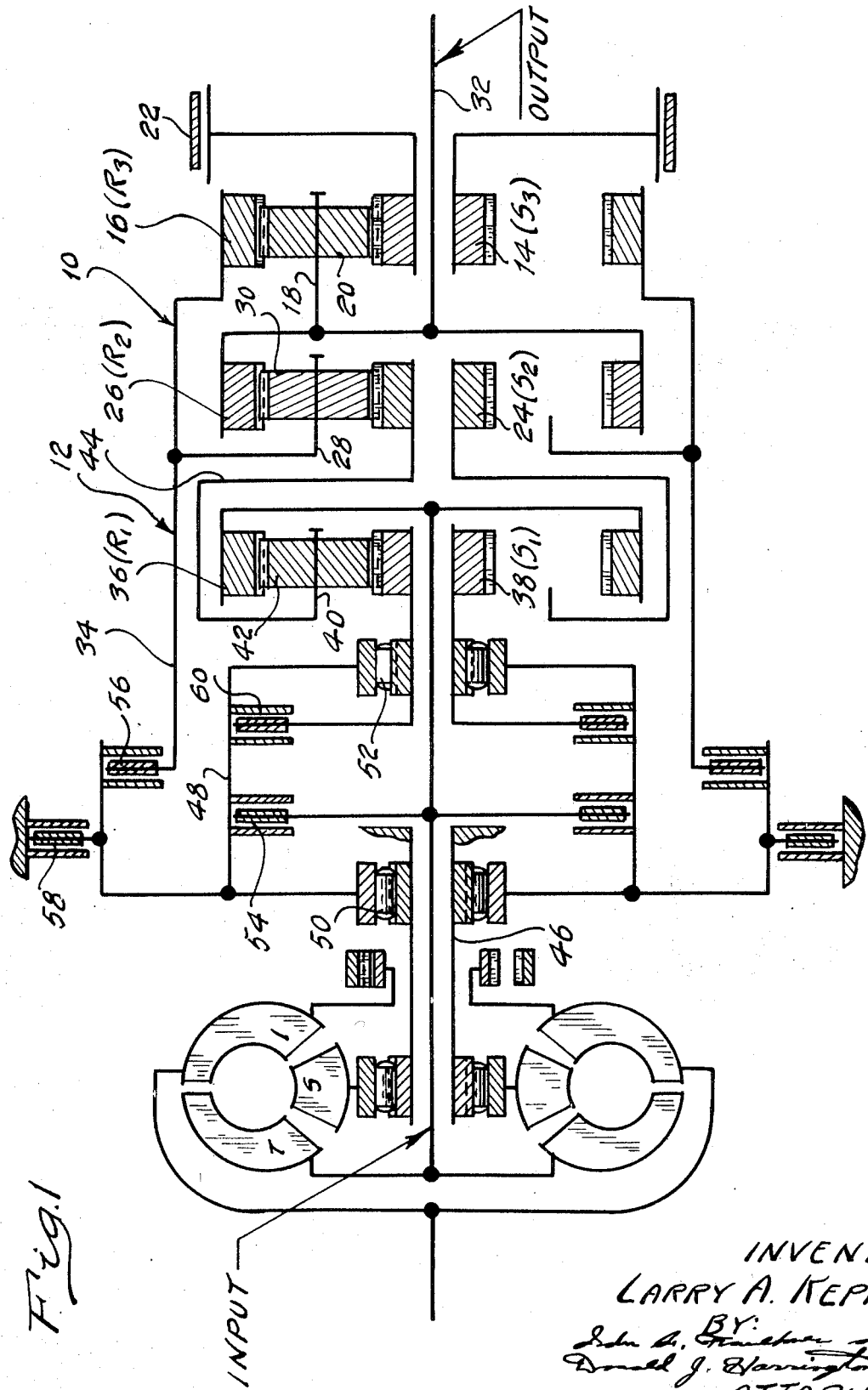
FIG. 1 is a schematic representation of a four-speed ratio power transmission mechanism embodying the features of my invention.

In FIG. 1 reference character 10 generally designates a three-speed ratio gear system having two input gear elements. Numeral 12 generally designates a simple planetary torque input gear unit situated on the torque input side of the gear system shown at 10.

Gear system 10 includes two simple planetary gear units. The first of these gear units comprises sun gear 14, ring gear 16, carrier 18 and planet pinions 20 journaled rotatably on the carrier 18 in meshing engagement with the sun gear 14 and the ring gear 16. Sun gear 14 is anchored by means of a selectively engageable friction brake band 22. The second simple planetary gear unit of the gear system 10 comprises sun gear 24, ring gear 26, carrier 28 and planetary gear element 30 journaled on the carrier 28 in meshing engagement with the sun gear 24 and ring gear 26. Ring gear 26 is connected directly to the carrier 18 of rearmost gear unit. Both carrier 18 and ring gear 26 are connected directly to the power output shaft, shown at 32.

Sun gear 14 acts as a torque reaction member during operation in the first, second and third forward driving speed ratios.

Carrier 28 and ring gear 16 are connected to torque transfer drum 34, which surrounds simple planetary gear unit 12. This gear unit includes a ring gear 36, a sun gear 38, a carrier 40 and planet pinions 42 journaled rotatably on a carrier 40.

Carrier 40 is connected drivably to a sun gear 24 through a torque transfer member 44. Ring gear 36 for the gear unit 12 is connected directly to power input shaft 46.

A clutch drum 48 is adapted to be anchored to the transmission housing through an overrunning brake 50 during operation in the first speed ratio. Drum 48 is connected during operation in the first speed ratio and in the second speed ratio to sun gear 38 through an overrunning coupling 52. A selectively engageable friction clutch 54 connects the power input shaft 46 to the drum 48 during operation in the second, third and fourth speed ratios. During operation in the third and fourth speed ratios and during operation in the reverse drive range, drum 48 is connected directly to transfer drum 34 through a selectively engageable friction clutch 56.

A friction brake 58 is adapted to connect the drum 48 to the transmission housing during operation in the reverse drive range and also during operation in low speed ratio drive if hill braking is desired. This brake is not required for operation, however, during normal forward driving. Reaction torque in that instance is delivered to the transmission housing through tee overrunning brake 50.

Clutch drum 48 is adapted to be connected directly to the sun gear 38 during operation in the fourth speed ratio and during hill braking operation by means of a selectively engageable friction clutch 60.

Low speed ratio, forward drive operation is achieved by engaging brake 22. Input torque from the shaft 46 is delivered to the ring gear 36 and reaction torque is distributed from the sun gear 38 through the coupling 52 and through the overrunning brake 50 to the transmission housing. Output torque from the carrier 40 is distributed to the sun gear 24 of the gear system 10 as forward driving torque is imparted to carrier 28. A portion of the carrier torque is distributed to the ring gear 16. That portion again is multiplied by the rearmost gear unit and the output torque of carrier 18 for the rearmost gear unit is distributed to the output shaft 32 to complement the torque acting on the ring gear 26.

Second gear ratio is achieved by engaging clutch 54. This in effect connects directly the ring gear 36 to the sun gear 38, thereby causing gear unit 12 to assume a ratio of unity. The output torque from the gear unit 12 still is delivered to the sun gear 24. The overall ratio, however, is higher than the ratio that exists during operation in the first speed ratio since torque multiplication in gear unit 12 does not occur.

Delivery of torque from the gear unit 12 to power input sun gear 24 of the gear system 10 is interrupted and is distributed instead to ring 16 to effect a ratio change from the second speed ratio the third speed ratio. This is accomplished by engaging clutch 56 while clutch 54 remains applied. Torque transfer drum 34 and ring gear 16 now become connected directly to the power input shaft 46 through the engaged clutches 56 and 54. In these circumstances the overrunning coupling 52 freewheels. Sun gear 14 continues to serve as a reaction member, however, since brake band 22 remains applied. With torque being distributed to the input ring gear 16, output torque is distributed from carrier 18 to the output shaft 32.

Fourth speed ratio is accomplished by engaging clutch 60 while clutches 54 and 56 remain applied. This connects together all of the gear elements for rotation in unison and the overall ratio then becomes unity. Friction brake band 22 is released at that time and overrunning brake 50 freewheels.

Reverse drive is achieved by engaging clutch 56 and brake 58. Brake band 22 is released. Torque is distributed during reverse drive from the shaft 46 to the ring gear 36. Reaction torque is distributed from sun gear 38 through the overrunning coupling 52 and the engaged brake 58 to the transmission housing. Carrier 28 is anchored to the housing through the engaged clutch 56 and the engaged brake 58. It thus is capable of acting as a reaction member as carrier torque is distributed from carrier 40 to the sun gear 24. The motion imparted to the sun gear 24 is reversed, and ring gear 26 and the output shaft 32 connected thereto are driven in reverse direction. During hill braking operation, clutch 50 remains applied, thereby bypassing the overrunning coupling 52.

Figure 2:
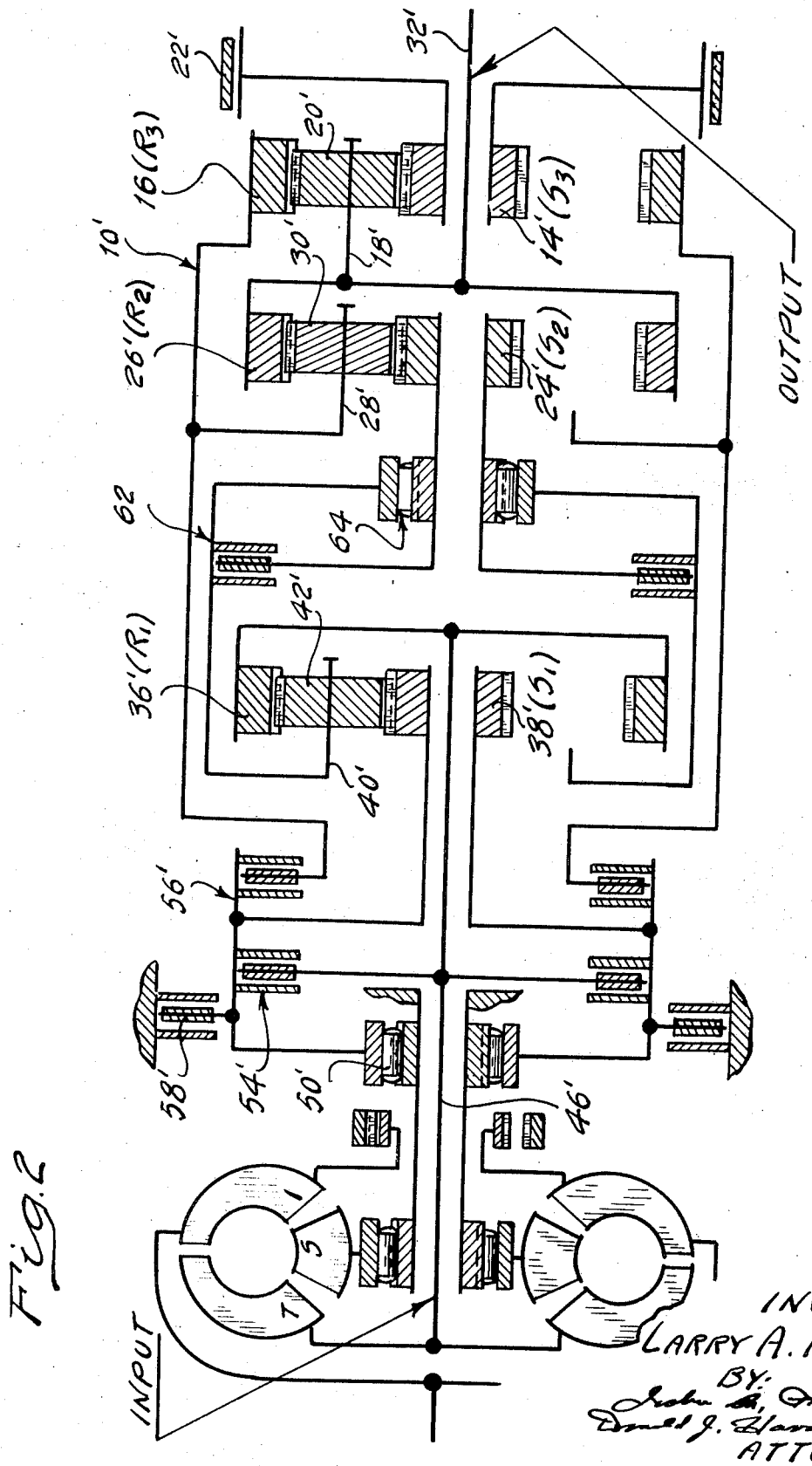
FIG. 2 is a schematic representation of an alternate embodiment of my invention. It is similar to the mechanism of FIG. 1, although the torque transmitting clutches are arranged differently.

The embodiment of FIG. 2 includes the same basic gear elements as the embodiment of FIG. 1. The clutching arrangement, however, is changed. The clutch 60 and the overrunning coupling 52 have been eliminated and they have been replaced by clutch 62 and coupling 64. The other elements of the embodiment of FIG. 2 that are common to the embodiment of FIG. 1 are designated by similar reference characters although prime notations have been added.

Coupling 64 connects the sun gear 24' to carrier 45 during operation of the first speed ratio and the second speed ratio as well as during reverse drive. If hill braking operation in the first, second or reverse drive ratios is desired, clutch 62 may be applied thereby bypassing the coupling 64.

Clutch 62 is applied also during operation in the fourth speed ratio. At that time clutches 56' and 54' are engaged.

The mode of operation of the embodiment of FIG. 2 is the same as the embodiment of FIG. 1. That is, during operation in the first, second and third speed ratios the brake 22' is applied thereby anchoring the sun gear 14'. Clutch 54' is applied during second, third and fourth speed ratio operation, brake 58' is applied during operation in reverse drive range and during hill braking in the first speed ratio. Overrunning coupling 50' distributes reaction torque to the housing during operation in the first speed ratio if the brake 58' is not applied.

Clutch 56' is applied during operation in third, fourth and reverse ratios, and overrunning coupling 64 is capable of delivering torque during operation in the first, second and reverse drive ranges. Clutch 62 is applied during first and second hill braking operation, during fourth speed ratio operation and during reverse hill braking operation.

The chart in FIG. 2A indicates the torque multiplication ratios that are achieved if the ratios of the ring gear diameters to the sun gear diameters are of the values indicated. The chart indicates that a relatively small ratio step occurs between the fourth speed ratio and the third speed ratio. The torque multiplication ratio of 3.00 during reverse drive operation and during low speed ratio operation is high enough for use in a practical automotive vehicle driveline.

Figure 3:
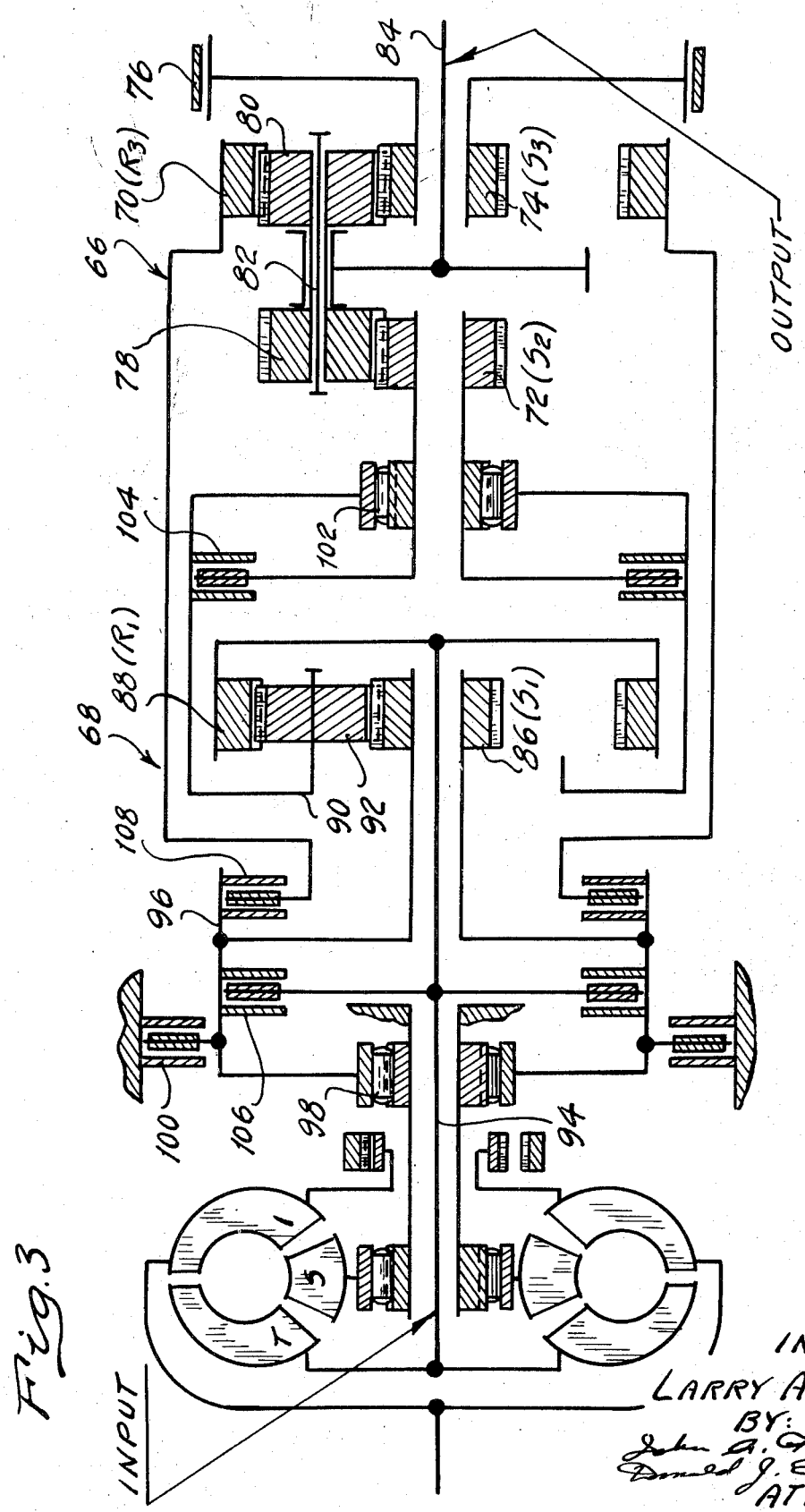
FIG. 3 is a third embodiment of my invention which employs a compound, planetary, three-speed ratio gear system rather than the simple planetary gear system of FIGS. 1 and 2.

In FIG. 3 I have indicated a transmission mechanism embodying the improvements of my invention and which includes a compound, planetary, three-speed ratio gear system 66 in combination with an input torque multiplying unit 68. Gear system 66 has two torque input elements; namely, ring gear 70 and sun gear 72. A second sun gear 74, which may be of the same diameter as the sun gear 72 is adapted to be anchored by friction brake band 76 during operation in the first, second and third speed ratio.

A first set of planet pinions 78 engages sun gear 72. A second set of planet pinions 80 engages sun gear 74 and ring gear 70. Pinions 78 and 80 also engage each other. The pinions 78 and 80 are journaled for rotation on a common carrier 82 which is connected directly to the output shaft 84.

Gear unit 68 includes sun gear 86, ring gear 88, carrier 90 and planet pinions 92 journaled on the carrier 90. Ring gear 88 is connected directly to the power input shaft 94. Sun gear 86 is connected to clutch drum 96, which in turn is adapted to be anchored against the stationary transmission housing through an overrunning brake 98. Brake 98 is engaged during first speed ratio operation. If hill braking is desired in the first speed ratio, clutch drum 96 may be anchored by selectively engageable friction brake 100. This brake is engaged also during reverse drive operation so that sun gear 86 may act as a reaction element.

Sun gear 72 is connected to carrier 90 through an overrunning coupling 102 during operation in low speed ratio and intermediate speed ratio. It provides a connection also during reverse drive between the sun gear 72 and the carrier 90. Friction clutch 104 also establishes a connection between carrier 90 and sun gear 72 if hill braking operation is desired during first speed ratio operation or during second speed ratio operation, as well as during operation in reverse. Clutch 104 is engaged also during fourth speed ratio operation.

To effect a ratio change from the low speed ratio to the second speed ratio, friction clutch 106 is applied. This connects the power input shaft 94 directly to the sun gear 86 thereby locking up the gear unit 68. The torque distributed to the sun gear 72 is not multiplied during second speed ratio operation although the gear unit 68 does multiply the torque acting on the sun gear 72 during operation in the first speed ratio.

To effect a ratio change from the second speed ratio to the third speed ratio, clutch 106 is applied simultaneously with clutch 108. This connects directly the shaft 94 with the ring gear 70. Coupling 102 freewheels and carrier torque acting on the carrier 82 then is distributed to the output shaft 84.

Fourth speed ratio operation is achieved by engaging clutches 104, 106 and 108 simultaneously. This locks up the gearing for rotation in unison with a one-to-one speed ratio. Brake 76 is released during fourth speed ratio operation and during reverse drive operation.

During reverse drive operation, sun gear 86 acts as a reaction element and ring gear 70 acts as a second reaction element. Carrier torque on the carrier 90 is distributed through the coupling 102 or through the clutch 104 to the sun gear 72. With this ring gear 70 acting as a reaction point, sun gear 74 is caused to freewheel as the carrier 82 is driven in reverse direction.

In FIG. 4 I have indicated another embodiment of my invention. It includes a revised three speed ratio gear system 110. The torque input gear unit of the embodiment of FIG. 4 corresponds to the torque input gear unit 12 in the embodiment of FIG. 1. For this reason the elements of the torque input gear unit, including the clutches and the brakes, have been designated by similar reference characters although double prime notations have been added.

As in the other embodiments, the three speed ratio gear system of FIG. 4 has two input elements, the first of which is ring gear 112 and the second of which is carrier 114. Ring gear 112 and carrier 114 form elements of a simple planetary gear unit which includes also sun gear 116 and planet pinions 118 which are journaled on the carrier 114 and which are in meshing engagement with ring gear 112 and sun gear 116. Carrier 114 is connected to ring gear 120 of a second simple planetary gear unit. This gear unit includes also sun gear 122, carrier 124 and planet pinions 126 journaled rotatably on the carrier 124 in meshing engagement with ring gear 120 and sun gear 122. Carrier 124 is connected to the output shaft 128.

Sun gear 122 acts as a reaction member during operation in first, second and third speed ratios. It is adapted to be anchored by selectively engageable friction brake band 130. During operation in the fourth speed ratio, sun gear 150 is connected directly to sun gear 122 through a selectively engageable friction clutch 132.

Sun gear 116 transfers reaction torque to the brake band 130 during operation in the first, second and reverse drive ratios through overrunning coupling 134. During operation in the first speed ratio, the input gear unit 12″ multiplies torque and distributes it to the ring gear 112. With the sun gear 116 acting as a reaction element, the torque is multiplied and distributed to the ring gear 120. With the sun gear 122 also acting as a reaction element the torque again is multiplied and distributed to the carrier 124 and hence the power output shaft 128. The same torque flow path through the gear system 110 is retained for second speed ratio operation although the torque input gear system 12′ is locked up upon engagement of the clutch 54″. Thus the overall ratio is changed from the value indicated in the first line of the chart of FIG. 4A to the value indicated in the second line thereof.

Third speed ratio operation is achieved by retaining the torque input gear system 12′ in a locked-up condition and engaging clutch 56″. Input torque now is distributed directly to the carrier 114, causing coupling 134 to freewheel.

Fourth speed ratio is achieved by engaging clutch 132 while clutches 56″ and 54″ remain applied. All of the elements are locked together for rotation in unison with a one-to-one speed ratio.

During reverse drive sun gear 38″ is anchored by the brake 58″. The torque of carrier 40″ then is delivered to the ring gear 112 causing sun gear 116 to drive it in the reverse direction. Overrunning coupling 34, under these conditions, distributes sun gear torque from sun gear 116 to the sun gear 122. Ring gear 120 also is anchored by the brake 50″ since it is connected to the brake 58″ by the clutch 56″. Thus reverse driving torque is distributed to the carrier 124 and the output shaft 128.

Having thus described preferred embodiments of my invention what I claim and desire to secure by Unite States Letters Patent is:

1. A multiple speed ratio power transmission mechanism adapted to deliver driving torque from a driving member to a driven member comprising a three speed ratio gear system having two torque input elements and a single torque output element, a torque input gear unit having a ring gear member and a sun gear member and a carrier member, planet pinions carried by said carrier member in meshing engagement with said sun and ring gear members, said ring gear member being connected to said driving member, means for connecting the carrier member of said torque input gear unit to a first of the torque input elements of said three speed ratio gear system during operation in the lowest speed ratio, brake means for anchoring the sun gear of said torque input gear unit during operation in said lowest ratio, means for connecting together two members of said torque input gear unit to establish a ratio of unity therethrough during operation in the second speed ratio, means for connecting said driving member to a second of said torque input elements through said torque input gear unit during operation in the third speed ratio, and clutch means for connecting together the elements of said three speed ratio gear system as said torque input gear unit maintains a ratio of unity thereby establishing fourth speed ratio operation.

2. The combination set forth in claim 1 wherein the clutch means for connecting together the members of said torque input gear unit includes a selectively engageable clutch interposed between the ring gear and the sun gear members of said torque input gear unit and second selectively engageable clutch means for connecting said driving member to the second of said torque input elements of said three speed ratio gear system through said first clutch means during operation in the third speed ratio and the fourth speed ratio.

3. The combination set forth in claim 1 wherein the means for connecting said first torque input element of said three speed ratio gear system to the carrier member of said torque input gear unit comprising coupling means adapted to assume a torque delivery condition during first speed ratio operation, second speed ratio operation and reverse drive operation, and reverse brake means for anchoring the second torque input element of said three speed ratio gear system during reverse drive operation.

4. The combination set forth in claim 2 wherein the means for connecting said first torque input element of said three speed ratio gear system to the carrier member of said torque input gear unit comprises coupling means adapted to assume a torque delivery condition during first speed ratio operation, second speed ratio operation and reverse drive operation, and reverse brake means for anchoring the second torque input element of said three speed ratio gear system during reverse drive operation.

5. The combination set forth in claim 3 wherein the brake means for anchoring the sun gear member of said torque input gear unit comprises an overrunning coupling interposed between said sun gear member and a stationary portion of said mechanism thereby accommodating torque reaction delivery to said stationary portion in one direction while accommodating freewheeling motion of said sun gear member in the opposite direction.

6. The combination set forth in claim 4 wherein the brake means for anchoring the sun gear member of said torque input gear unit comprises an overrunning coupling interposed between said sun gear member and a stationary portion of said mechanism thereby accommodating torque reaction delivery to said stationary portion in one direction while accommodating freewheeling motion of said sun gear member in the opposite direction.

7. The combination set forth in claim 1 wherein the brake means for anchoring the sun gear member of said torque input gear unit includes an overrunning coupling connection between said sun gear member and a stationary portion of said mechanism, said overrunning coupling connection being adapted to establish a one-way driving connection between said driving member and the sun gear member of said torque input gear unit during operation in said lowest speed ratio, in second speed ratio and in reverse drive ratio.

8. The combination set forth in claim 2 wherein the brake means for anchoring the sun gear member of said torque input gear unit includes an overrunning coupling connection between said sun gear member and a stationary portion of said mechanism, said overrunning coupling connection being adapted to establish a one-way driving connection between said driving member and the sun gear member of said torque input gear unit during operation in said lowest speed ratio, in second speed ratio and in reverse drive ratio.

* * * * *